United States Patent Office 2,937,152
Patented May 17, 1960

2,937,152

CELLULAR POLYESTER-URETHANE RESIN AND PREPARATION OF SAME

Donald Noel Hunter, Luton, England, assignor to D. Napier & Son Limited, London, England, a British company No Drawing. Application December 31, 1956
Serial No. 631,456

Claims priority, application Great Britain January 6, 1956

5 Claims. (Cl. 260—2.5)

This invention relates to polyester resins suitable for reaction with an isocyanate to produce solid foam products, and to such products.

It is known that if a suitably compounded polyester resin containing free carboxyl groups is reacted with an isocyanate, for instance toluene di-isocyanate, a reaction takes place accompanied by the generation of carbon dioxide. The carbon dioxide forms bubbles in the reaction mixture and the reaction mixture simultaneously solidifies so that a solid foam can be produced. By carrying out the reaction in a mould or suitably shaped envelopes, shaped products can be obtained suitable for a variety of purposes. Such products are particularly useful in the aircraft industry, since the solid foams are of low density and of good mechanical strength. Hitherto, however, the foaming action has been difficult to control, so that it has been difficult to make solid foam products of sufficient uniformity on an industrial scale.

According to one aspect of the present invention a process for making a polyester resin suitable for reaction with an isocyanate to produce a solid foam product comprises performing an ester exchange reaction between castor oil and a polyhydric alcohol containing at least three hydroxyl groups in the molecule, and reacting the product of the ester exchange with a dicarboxylic acid.

Preferably the reaction with the dicarboxylic acid is carried out at an elevated temperature and is continued until the acid number of the reaction product attains a predetermined value. For example, the reaction may be stopped when the acid number is in the range 35 to 40.

The acid number indicates the number of COOH groups remaining in the resin, and as it is the COOH groups that react with the isocyanate to give off carbon dioxide it is important to stop the reaction between the ester exchange product and the dicarboxylic acid at a definite COOH content in order that the density of the product formed during the subsequent foaming reaction can be controlled.

The polyhydric alcohol employed, as already indicated, must contain at least three hydroxyl groups in the molecule. Among the suitable polyhydric alcohols glycerol may be mentioned as an example.

Among the suitable dicarboxylic acids that may be mentioned are sebacic acid and adipic acid.

The resin can be stored for long periods at room temperature, and is immediately compatible with an isocyanate such as toluene di-isocyanate to produce a solid foam. The foaming action takes place in a reproducible manner without demanding very close control over the conditions under which the foaming takes place. The solidification takes place rapidly even at room temperature and the solid foams so produced are stable, rigid, tough and shock-resisting.

The foaming reaction can be effected merely by mixing the resin with the appropriate isocyanate.

The invention may be performed in various ways and two specific examples will now be described by way of illustration. In the examples all the parts mentioned are by weight.

Example 1.—600 parts of castor oil, 1120 parts of glycerine and 12 parts of sodium carbonate were agitated in a vessel designed to allow water to pass off, while nitrogen was passed through the mixture. The purpose of the sodium carbonate and the nitrogen atmosphere is to prevent excessive darkening of the reaction product. The mixture was heated to between 170° C. and 180° C. and maintained at this temperature for between 30 to 60 minutes during which the agitation was continued, until a homogeneous condition was achieved. 1450 parts of sebacic acid and 350 parts of phthalic anhydride were then added and the temperature was raised to 200° C. The acid number was periodically tested as described below and the reaction mass was maintained at the said temperature until the acid number was between 35–40. Heating was then stopped and the resin cooled down. The acid number of the cold batch was then determined.

The acid number can be determined by drawing a sample, for instance one ml., of the reaction mixture from the reaction vessel, placing it in a flask and weighing it. The sample is then dissolved in 25 mls. of neutral 1:1 benzene:alcohol mixture, warming gently on a water bath for a few seconds if necessary. A few drops of phenolphthalein are added and the sample is titrated with 0.1 N KOH. The acid number is given by the following expression Acid number
$$= \frac{\text{mls. of KOH} \times \text{normality of KOH} \times 56.11}{\text{weight of sample in grams}}$$

Example 2.—600 parts of castor oil, 1120 parts glycerine and 12 parts sodium carbonate were heated at between 170–180° C. for one hour in an atmosphere of nitrogen as in Example 1.

1100 grams of adipic acid were added and the whole was heated at 200° C. until the acid number had dropped to 35.

In both examples the resin obtained was a viscous syrupy mass which was almost immediately compatible with toluene di-isocyanate. When the resin was mixed with the di-isocyanate in a preferred ratio of 1.0 part of resin to 0.6 part of the isocyanate, the mixture expanded and gelled within fifteen minutes of mixing to give a hard foam which was tough, rigid and of uniform pore size. Although the foam was hard enough to handle a comparatively short time after mixing, further hardening took place on standing, and unless stoving is used to accelerate the hardening a minimum period of twelve hours is suggested before subjecting the foam product to mechanical stress.

Increase in the proportion of di-isocyanate reduces the thermoplasticity of the foam while reducing the proportion of di-isocyanate increases the thermoplasticity.

Owing to the excellent compatibility of the resin with the di-isocyanate many of the difficulties previously experienced in the application of such foam to structural work no longer exist.

The rapid homogenization makes it possible to produce foams that are notable for their uniformity and quick setting with the minimum of effort and without having to resort to various expedients for stabilizing the structure during expansion.

The resin of the present invention is particularly suitable for the production of foams in situ, for instance for the filling of aircraft fin sections, in between partitions for sound and thermal insulations, and in general for stabilizing thin shell structures.

The invention embraces not only the process of making the polyester resin but also polyester resins when so

What I claim as my invention and desire to secure by Letters Patent is:

1. A process for producing a solid foam resin comprising reacting (A) an arylene di-isocyanate with (B) a stable polyester resin, said polyester resin being the reaction product of (1) a compound selected from the group consisting of adipic acid, sebacic acid and phthalic anhydride and (2) an ester which is the product of an ester interchange reaction carried out by heating the reactants (a) castor oil and (b) a polyhydric alcohol having three hydroxyl groups, the ratio by weight of said arylene di-isocyanate (A) to said polyester (B) being about 0.6:1.0.

2. A process according to claim 1 in which said polyhydric alcohol is glycerine.

3. A process according to claim 1 in which said di-isocyanate is toluene di-isocyanate.

4. A process according to claim 1 which includes carrying out the reaction of (1) and (2) until the acid number of the reaction product is in the range 35–40.

5. A solid foam product consisting essentially of the reaction product of from 0.6 part by weight of an arylene di-isocyanate and about 1 part by weight of a stable polyester resin, said polyester resin being the reaction product of (1) a compound selected from the group consisting of adipic acid, sebacic acid and phthalic anhydride and (2) an ester which is the product of an ester interchange reaction carried out by heating the reactants (a) castor oil and (b) a polyhydric alcohol having three hydroxyl groups.

References Cited in the file of this patent

UNITED STATES PATENTS

| | | |
|---|---|---|
| 1,783,167 | Bruson | Nov. 25, 1930 |
| 2,602,783 | Simon et al. | July 8, 1952 |
| 2,772,245 | Simon et al. | Nov. 27, 1956 |
| 2,787,601 | Detrick et al. | Apr. 2, 1957 |

OTHER REFERENCES

Wakeman: "The Chemistry of Commercial Plastics," copyright 1947, page 246.